United States Patent [19]

Debras et al.

[11] Patent Number: 6,150,480
[45] Date of Patent: Nov. 21, 2000

[54] PRODUCTION OF POLYETHYLENE FOR BLOW MOLDING

[75] Inventors: Guy Debras, Les Bons Villers; Phillipe Bodart, Clermont-sous-Huy, both of Belgium

[73] Assignee: Fina Research, S.A., Feluy, Belgium

[21] Appl. No.: 09/020,937

[22] Filed: Feb. 9, 1998

[30] Foreign Application Priority Data

Feb. 7, 1997 [EP] European Pat. Off. ............. 97101974

[51] Int. Cl.$^7$ ...................................................... C08F 4/24
[52] U.S. Cl. ..................... 526/106; 526/105; 526/132; 526/134; 502/117
[58] Field of Search .................... 526/105, 106, 526/132, 134

[56] References Cited

U.S. PATENT DOCUMENTS

| | | | |
|---|---|---|---|
| 4,049,896 | 9/1977 | Rekers et al. ........................... | 526/129 |
| 4,118,340 | 10/1978 | Rekers et al. ........................... | 252/428 |
| 4,356,294 | 10/1982 | Rekers et al. ........................... | 526/100 |
| 4,593,079 | 6/1986 | Rekers et al. ........................... | 526/100 |

*Primary Examiner*—David W. Wu
*Assistant Examiner*—Roberto Rabago
*Attorney, Agent, or Firm*—Jim D. Wheelington

[57] ABSTRACT

A process for producing high density polyethylene suitable for blow molding and having high environmental stress cracking resistance and rigidity, comprising copolymerizing ethylene and a $C_3$–$C_{10}$ alpha-olefinic comonomer in the presence of a chromium-based catalyst having an alumina-containing support, and an organoboron compound, wherein the atomic ratio of boron in the organoboron compound to the chromium in the chromium-based catalyst is from around 0.2 to around 0.4.

23 Claims, 1 Drawing Sheet

- Cat 1 + TEB (650°)
  Cat 1 (650°)

PRODUCTION OF POLYETHYLENE FOR BLOW MOLDING

BACKGROUND OF THE INVENTION

1. Field of the Invention

The present invention relates to a process for the production of polyethylene for blow molding.

2. Description of the Prior Art

Polyethylene is well known for use in the manufacture of blow molded articles, for example bottles. It is known in the art that polyethylene resin produced for the manufacture of blow molded articles must achieve a balance of (a) to physical properties of the resin so that the resultant blow molded article has the required physical characteristics and (b) processing properties of the resin so that the polyethylene melt may readily be processed into the blow molded article. In order to achieve good processability of the polyethylene resins, it is desired that the flow properties and the shear response of the polyethylene are improved by broadening the molecular weight distribution of the polyethylene. Moreover, the physical properties of the solid resin when employed for blow molding bottles require the resin to have a high density and a high environmental stress cracking resistance (ESCR).

As a general rule, a polyethylene having a higher density tends to have a higher degree of stiffness, thereby making it more suitable for blow molding into bottles. A higher stiffness in the known polyethylene increases bottle strength and enables thinner walls to be employed. However, in general, the environment stress cracking resistance of polyethylene has an inverse relationship with stiffness. In other words, as the stiffness of polyethylene is increased, the environment stress cracking resistance decreases, and vice versa. This inverse relationship is known in the art as the ESCR-rigidity balance. It is required, for any given bottle grade polyethylene, to achieve a compromise between the environmental stress cracking resistance of the polyethylene and the rigidity of the polyethylene employed in the blown bottle.

A number of different catalyst systems have been disclosed for the manufacture of polyethylene, in particular high density polyethylene (HDPE) suitable for blow molding. It is known in the art that the physical properties, in particular the mechanical properties, of a polyethylene product vary depending on what catalytic system was employed to make the polyethylene. This is because different catalyst systems tend to yield different molecular weight distributions in the polyethylene produced. It is known to employ a chromium-based catalyst (i.e. a catalyst known in the art as a "Phillips catalyst)". Such a chromium-based catalyst enables the production of polyethylene having desirable physical and rheological properties.

It is known in the art to use chromium-based catalysts to polymerize HDPE and in particular to produce high density polyethylene having high resistance to environmental stress cracking. For example, EP-A-0291824, EP-A-0591968 and U.S. Pat. No. 5,310,834 each disclose mixed catalyst compositions, incorporating chromium-based catalysts, for the polymerization of polyethylene. Each of those prior proposals suffers from the disadvantage that mixed catalysts are required which can increase the complexity and cost of the process.

U.S. Pat. No. 4,049,896 discloses an olefin polymerization catalyst and process in which the catalyst system comprises a chromium-based catalyst with aluminum and triethyl borane (TEB). The aluminum is typically present in an amount of 3.7 wt % based on the silica of the support for the catalyst and TEB is present in an amount to yield a 2.9 B/Cr atomic ratio. It is stated that the polymers have improved flow properties and shear response. However, there is no disclosure of the manufacture of high density polyethylene and the specification does not address the problem of achieving high ESCR in conjunction with high density.

SUMMARY OF THE INVENTION

It is an aim of the present invention to provide a process for producing high density polyethylene suitable for blow molding which employs a single chromium-based catalyst.

It is a further aim of the present invention to provide such a process for producing blow molding grade polyethylene having a good balance of rheological and mechanical properties.

It is a yet further aim of the present invention to provide a process for producing blow molding grade polyethylene having a good balance between the environmental stress cracking resistance and rigidity.

Accordingly, the present invention provides a process for producing high density polyethylene suitable for blow molding and having high environmental stress cracking resistance and rigidity, the process comprising copolymerizing ethylene and an alpha-olefinic comonomer comprising from 3 to 10 carbon atoms, in the presence of a chromium-based catalyst, having an alumina-containing support, and an organoboron compound, wherein the atomic ratio of boron in the organoboron compound to the chromium in the chromium-based catalyst is from around 0.2 to around 0.4.

Preferably, the catalyst contains from 0.75 to 6 wt % aluminum, based on the weight of the catalyst.

More preferably, the catalyst contains from 2 to 4 wt % aluminum, based on the weight of the catalyst.

Preferably, the organoboron compound comprises an alkyl boron, more preferably triethyl boron. The alkyl boron may be present in an amount of from 0.6 to 1 ppm based on the weight of an inert diluent for the ethylene and the comonomer. This typically corresponds to a B/Cr atomic ratio of from 0.22 to 0.36.

The present invention also provides the use for improving the environmental stress cracking resistance of a high density polyethylene having a density of from 0.956 to 0.958 g/cc of a catalyst system comprising an organoboron compound and a chromium-based catalyst having a alumina-containing support, wherein the catalyst system has boron/chromium atomic ratio of from 0.2 to 0.4.

BRIEF DESCRIPTION OF THE DRAWINGS

The present invention will be described with reference to the following drawings, in which.

DETAILED DESCRIPTION OF THE INVENTION

Figure 1:
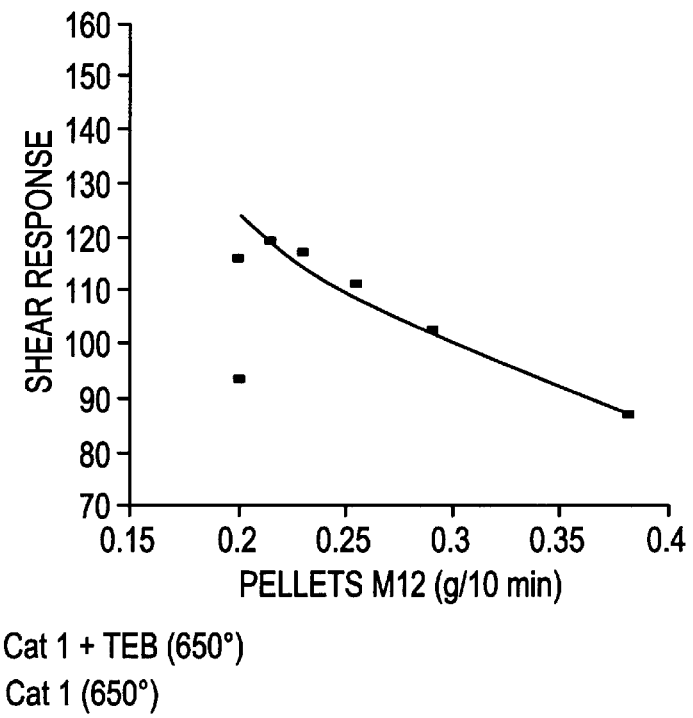
FIG. 1 is a graph showing the relationship between shear response and the melt index $MI_2$ of pellets of polyethylene produced in accordance with the Examples of the present invention.

The present invention is predicated on the surprising discovery by the present inventor that the use of the combination of a particular catalyst system comprising chromium-based catalyst, having an alumina-containing support, and an organoboron compound, can produce a blow molding grade polyethylene exhibiting not only improved mechanical properties, in particular an improved ESCR-rigidity balance, than other chromium-based catalysts, but also improved Theological properties, and thus processing performance.

The high density polyethylene preferably has a Bell ESCR F50 value of at least 78 hours.

The improved processing performance results from broadening the molecular weight distribution and thus increasing the shear response, while maintaining the same good ESCR-rigidity balance. The addition of the organoboron compound, preferably alkyl boron, also has been discovered to allow improvement of the processing performance insofar as melt fracture properties are concerned.

The present inventor has also discovered that the addition of an alkyl boron, in particular triethyl boron, to the catalyst employed in the process of the invention can boost the activity of the catalyst thereby increasing processing yields.

The preferred chromium-based catalyst comprises chromium oxide on a silica-alumina support. The support preferably comprises from 0.75 to 6 wt % aluminum, more preferably from 2 to 4 wt % aluminum, most preferably around 2 wt % aluminum, based on the weight of the chromium-containing catalyst. The catalyst preferably comprises at least 0.5 wt % chromium, more preferably from 0.5 to 5 wt % chromium, most preferably around 1 wt %, based on the weight of the chromium-containing catalyst The catalyst may have a specific surface area of from 200 to 700 $m^2/g$, preferably from 275 to 500 $m^2/g$, most preferably around 350 $m^2/g$ and a volume porosity of greater than 1 cc/g preferably from around 1.5 to 3 cc/g, most preferably around 2.5 to 2.7 cc/g. Particularly preferred catalysts have a pore volume of at least 2.5 cc/g and a specific surface area of at least 275 $m^2/g$.

A particularly preferred chromium-based catalyst for use in the present invention comprises a catalyst ("catalyst 1") having the following properties: a support of $SiO_2$ and $Al_2O_3$ having around 2.1 wt % Al, a pore volume of 2.7 cc/g and a specific surface area of 360 $m^2/g$. An alternative preferred chromium-based catalyst for use in the invention comprises a catalyst ("catalyst 2") having the following properties: a support of $SiO_2$ and $Al_2O_3$ having around 0.76 wt % $Al_2$, a chromium content of around 0.5 wt %, a pore volume of 2.5 cc/g and a specific surface area of 288 $m^2/g$.

The chromium-based catalyst is preferably activated at an elevated temperature, preferably at a temperature from 500 to 900° C., more preferably from 550 to 750° C., most preferably around 650° C.

In the preferred process of the present invention, the copolymerization process is carried out in the liquid phase in which ethylene, and an alpha-olefic comonomer comprising from 3 to 10 carbon atoms, are present in an inert diluent. The comonomer may be selected from 1-butene, 1-pentene, 1-hexene, 4-methyl 1-pentene, 1-heptene and 1-octene. The inert diluent is preferably isobutane. The copolymerization process is typically carried out at a temperature of from 90 to 110° C., most preferably around 103° C. The copolymerization process is preferably carried out at a pressure of from 20 to 42 bar, most preferably at a minimum pressure of around 24 bar. Typically, in the copolymerization process ethylene comonomer comprises 0.5 to 6% by weight and the comonomer comprises from 0.5 to 3% by weight, based on the total weight of the ethylene monomer and comonomer in the inert diluent.

In the process of the invention, the organoboron compound, preferably an alkyl boron, more preferably triethyl boron, is introduced into the polymerization reactor in the inert diluent. Preferably, the alkyl boron comprises from 0.6 to 1 ppm, based on the weight of the inert diluent.

In the process of the present invention, the chromium-based catalyst is introduced into the polymerization reactor. Alkylene monomer, comonomer and alkyl boron are fed into the polymerization reactor in the inert diluent and hydrogen gas is also introduced into the polymerization reactor. The polymerization product of high density polyethylene is discharged from the reactor and separated from the diluent which can then be recycled.

The polyethylene resins produced in accordance with the process of the invention have physical properties making them particularly suitable for use as blow molding grade polyethylenes. In particular, the process of the present invention can produce polyethylene resins in pellet form having a high load melt index (HMLI) ranging from around 19.1 to 28.3 g/10 min and a melt index ($MI_2$) ranging from 0.17 to 0.255 g/10 min. Both the high load melt index HMLI and the melt index $MI_2$ were determined during the procedures of ASTM D 1238 using respective loads of 21.6 kg and 2.16 kg at a temperature of 190° C. Moreover, the shear response, which is a ratio between the HLMI and $MI_2$ values and is representative of the processability of the polyethylene resins produced in accordance with the process of the invention can vary from 110 to 119.

The process of the present invention also can produce polyethylene resins having a good compromise between the ESCR and rigidity. In particular, the polyethylene resins produced in accordance with the preferred embodiments of the present invention can have a Bell ESCR (50° C. 100% antarox) of from 78 to 174 hours, measured in accordance with ASTM D-1693-70, Procedure B.

When triethyl boron (TEB) is employed as a reducing agent in the preferred process of the present invention, the productivity of the polymerization process can be greatly increased. For example, for catalyst 1 identified above, the productivity can be increased from a value of a polyethylene/catalyst weight ratio of 975 where no triethyl boron is employed to polyethylene/catalyst weight ratio of from 1650 to 2470 when employing from 0.6 to 1 ppm of triethyl boron.

In addition, the use of triethyl boron as a reducing agent in accordance with the preferred embodiments of the invention provides the technical advantage that the processing performance, as represented by the reduced incidence of melt fracture when mixing the melt at rotational speeds of around 60 rpm, can substantially be avoided.

In order to demonstrate the preferred processes of the present invention in which a chromium-based catalyst was employed to polymerize polyethylene in combination with an alkyl borane, in particular triethyl boron, a number of runs to copolymerize ethylene to form high density polyethylene were performed as Examples 1 to 5.

EXAMPLES 1 TO 5

In each of the Examples, a liquid comprising ethylene, 1-hexene and the balance isobutane as an inert diluent was fed into a polymerization reaction zone at a pressure of 42 bars and at a polymerization temperature of around 102 to 103° C. Hydrogen was also fed into the polymerization reaction zone. Triethyl boron (TEB) was also supplied to the polymerization reaction zone in the isobutane. In Examples 1 to 4, the catalyst system comprised the chromium-based catalyst identified as catalyst 1 above and in Example 5 the catalyst system comprises the chromium-based catalyst identified as catalyst 2 above. In each Example the catalyst had been subjected to an activation in air to temperature of around 650° C. The polymerization conditions and the properties of the resultant polyethylene products are summarized in Table 1.

COMPARATIVE EXAMPLE 1

Comparative Example 1 was performed with the same catalyst, catalyst 1, but without any addition of triethyl boron. It will be seen that Comparative Example 1 yielded polyethylene pellets having a flexural modulus at 0.4% of 1490 MPa and a Bell ESCR (50° 100% antarox) of 79 hours.

It will be seen that in Examples 1 to 4, which employ triethyl boron in an amount of either 0.6 ppm (Example 1) or 1 ppm (Examples 2 to 4) the ESCR values were substantially the same or better than those of Comparative Example 1, but with a significantly increased productivity for Examples 1 to 4 as compared to Comparative Example 1, as represented by the ratio of the weight in grams of polyethylene produced per gram of catalyst.

In addition, the shear response of the polyethylene pellets produced in accordance with Examples 1 to 4 was at least 111 which was significantly higher than the shear response of the polyethylene pellets produced in accordance with Comparative Example 1, which was 93. This demonstrates that the processability of the pellets produced using catalyst 1 can significantly be improved by the use of TEB in the copolymerization process.

For Example 5 it will be seen that a different aluminum-containing catalyst, catalyst 2, can also yield high ESCR values and productivity.

FIG. 1 shows the relationship between the shear response and the melt index $MI_2$ of the pellets of Examples 1 to 4. It will be seen that for Examples 1 to 4 which employ triethyl boron as a reducing agent, a significantly increased shear response at any given melt index value can be achieved as compared with Comparative Example 1 in which no triethyl boron was employed in the polymerization process. Thus the addition of TEB to the polymerization process can increase the shear response of the resultant blow molding grade polyethylene resins.

Figure 2:
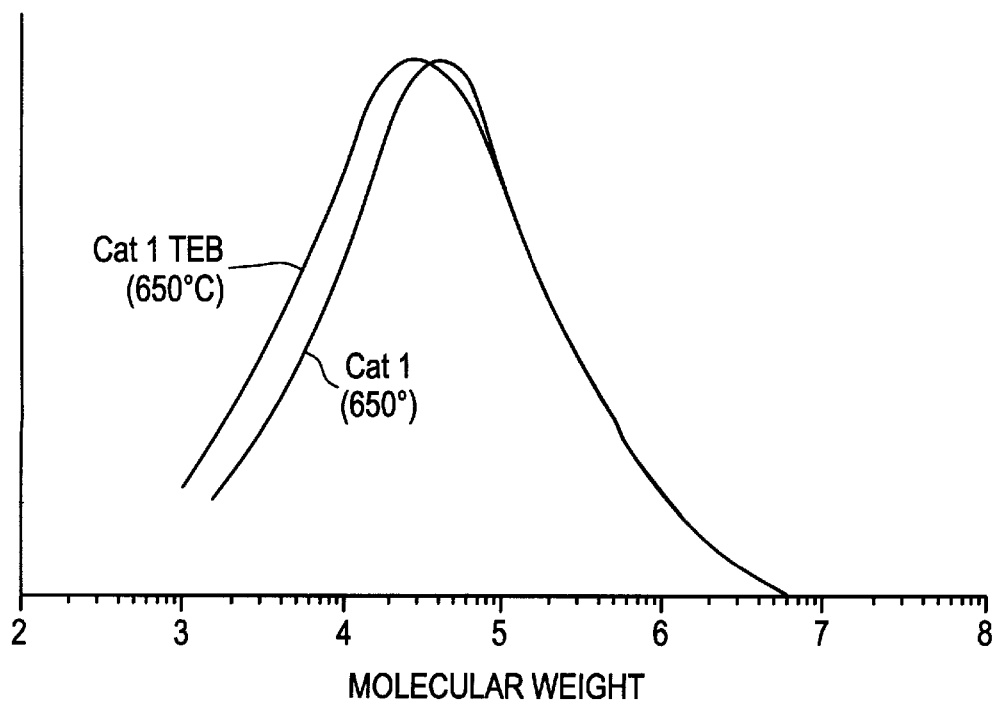
FIG. 2 is a gel phase chromatography graph of high density polyethylenes produced in accordance with the Examples of the process of the present invention.

As can be seen from FIG. 2 which shows two gel phase chromatography plots, one for the polyethylene produced in accordance with Comparative Example 1 and another for one of Examples 1 to 4 in which triethyl boron was added to the polymerization reactor, it can be seen that the addition of TEB to the polymerization reaction broadens the molecular weight distribution of the resultant blow molding grade polyethylene. This improves the processability of the polyethylene resin.

Table 1 also shows the incidence of melt fracture when the resultant polyethylene is melted and subjected to rotational shear at varying speeds. It will be seen that for Comparative Example 1 and each of Examples 1 to 4 no melt fracture occurred at rotational speeds of 20 and 40 rpm. However, at a rotational speed of 60 rpm, melt fracture occurred in three tests for the polyethylene product of Comparative Example 1, but not in those of any of Examples 1 to 4. This demonstrates that the addition of TEB in the polymerization reaction can allow improvement of the processing performance of the resultant blow molding grade polyethylene by providing an absence of melt fracture at 60 rpm.

COMPARATIVE EXAMPLES 2 AND 3

Table 1 also shows the polymerization conditions and the properties of the resultant polyethylene products of Comparative Examples 2 and 3. In Comparative Example 2 the catalyst was the same as that for Examples 1 to 4 and Comparative Example 1 but triethylaluminum (TEAL) was present as a co-catalyst and no TEB was present. In Comparative Example 3 a chromium-based catalyst was employed which does not contain any aluminum in the support thereof, the chromium-based catalyst comprising a catalyst, ("catalyst 3") having the following properties: a support of $SiO_2$, a chromium-content of around 1 wt %, a pore volume of 2.2 cc/g and a specific surface area of 320 $m^2/g$. The catalyst was subjected to activation at the temperature of around 650° C. In Comparative Example 2 TEAL was present in the reactants in an amount of 1 ppm and in Comparative Example 3 the TEB was present in the reactants in an amount of about 0.5 ppm.

It will be seen from Table 1 that Comparative Examples 2 and 3 yield a polyethylene pellet having a significantly lower Bell ESCR than obtainable by the use of the catalysts of Examples 1 to 5. The Bell ESCR values for Comparative Examples 2 and 3 were 20 and 35 hours respectively, which may be compared to the minimum Bell ESCR value of the Examples which is 78 hours for Example 2.

A comparison between the bell ESCR values of the Examples and the Comparative Examples clearly demonstrates that the use of an alumina-containing support in combination with an organoboron compound can provide good environmental stress crack resistance to a polyethylene resin.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Catalyst Type | 1 | 1 | 1 | 1 | 2 | 1 | 1 | 3 |
| Activation Temp. (° C.) | 650 | 650 | 650 | 650 | 650 | 650 | 650 | 650 |
| COPOLYMERIZATION CONDITIONS |  |  |  |  |  |  |  |  |
| Temperature (° C.) | 103 | 103 | 103 | 103 | 102 | 103 | 103 | 106 |
| TEB (ppm) | 0.6 | 1 | 1 | 1 | 1 | 0 | 0 | 0.5 |
| TEAL (ppm) | 0 | 0 | 0 | 0 | 0 | 0 | 1 | 0 |
| Ethylene (kg/h) | 9 | 10 | 10 | 10 | 10 | 9 | 9 | 8 |
| 1-hexene (cc/h) | 51 | 48 | 52 | 110 | 460 | 67 | 49 | 48 |
| Hydrogen (Nl/h) | 18 | 20 | 20 | 30 | 70 | 10 | 0 | 30 |
| Isobutane (kg/h) | 26 | 26 | 26 | 26 | 26 | 26 | 26 | 26 |

TABLE 1-continued

|  | Example 1 | Example 2 | Example 3 | Example 4 | Example 5 | Comparative Example 1 | Comparative Example 2 | Comparative Example 3 |
|---|---|---|---|---|---|---|---|---|
| PROPERTIES OF POLYETHYLENE PELLETS | | | | | | | | |
| HLMI (g/10) | 23.2 | 26.6 | 25.8 | 28.3 | 19.1 | 21.0 | 26.8 | 24.6 |
| MI2 (g/10) | 0.20 | 0.228 | 0.216 | 0.255 | 0.17 | 0.225 | 0.285 | 0.27 |
| Shear Response | 116 | 117 | 119 | 111 | 110 | 93 | 94 | 91 |
| Density (g/cc) | 0.9572 | 0.9573 | 0.9575 | 0.9563 | 0.956 | 0.9572 | 0.957 | 0.9574 |
| Mn (kDa) | 13.8 | 13.1 | 13.0 | 13.6 | 14.3 | 14.7 | 18 | |
| MW (kDa) | 206 | 199 | 205 | 197 | 210 | 203 | 163 | 191 |
| Mz (kDa) | 2333 | 2298 | 2427 | 2184 | 2156 | 2293 | 1679 | 1966 |
| MWD | 14.9 | 15.1 | 15.7 | 14.4 | 14.7 | 13.8 | 9.0 | 10.8 |
| ESCR F50 Bell 50° C. 100% (h) | 78 | 82 | 91 | 110 | 174 | 79 | 20 | 35 |
| MELT FRACTURE 20 rpm | 0 | 0 | 0 | 0 | — | 0 | — | — |
| 40 rpm | 0 | 0 | 0 | 0 | — | 0 | — | — |
| 60 rpm | 3 | 0 | 0 | 0 | — | 3 | — | — |
| PRODUCTIVITY (g PE/g cat) | 1650 | 1900 | 2470 | 1905 | 1585 | 975 | 1970 | 1390 |

Obviously, numerous modifications and variations of the present invention are possible in light of the above teachings. It is therefore to be understood that within the scope of the appended claims, the invention may be practiced otherwise than as specifically described herein.

What is claimed is:

1. A process for producing high density polyethylene suitable for blow molding, the process comprising copolymerizing ethylene and an alpha-olefinic comonomer comprising from 3 to 10 carbon atoms, in the presence of a chromium-based catalyst, having an alumina-containing support, and an organoboron compound, wherein the atomic ratio of boron in the organoboron compound to the chromium in the chromium-based catalyst is from around 0.2 to around 0.4.

2. A process according to claim 1 wherein the catalyst contains from 2 to 4 wt % aluminum, based on the weight of the catalyst.

3. A process according to claim 1 wherein the organoboron comprise an alkyl boron.

4. A process according to claim 2 wherein the organoboron comprise an alkyl boron.

5. A process according to claim 3 wherein the alkyl boron is triethyl boron.

6. A process according to claim 4 wherein the alkyl boron is triethyl boron.

7. A process according to claim 3 comprising an inert diluent wherein the alkyl boron is present in an amount of from 0.6 to 1 ppm, based on the weight of the inert diluent.

8. A process according to claim 4 comprising an inert diluent wherein the alkyl boron is present in an amount of from 0.6 to 1 ppm, based on the weight of the inert diluent.

9. A process according to claim 5 comprising an inert diluent wherein the alkyl boron is present in an amount of from 0.6 to 1 ppm, based on the weight of the inert diluent.

10. A process according to claim 6 comprising an inert diluent wherein the alkyl boron is present in an amount of from 0.6 to 1 ppm, based on the weight of the inert diluent.

11. A process according to claim 1 wherein the polyethylene has a melt index of from 0.17 to 0.255 g/10 min.

12. A process according to claim 1 wherein the catalyst has a pore volume of at least 2.5 cc/g and a specific surface area of at least 275 m$^2$/g.

13. A process according to claim 2 wherein the catalyst has a pore volume of at least 2.5 cc/g and a specific surface area of at least 275 m$^2$/g.

14. A process according to claim 3 wherein the catalyst has a pore volume of at least 2.5 cc/g and a specific surface area of at least 275 m$^2$/g.

15. A process according to claim 4 wherein the catalyst has a pore volume of at least 2.5 cc/g and a specific surface area of at least 275 m$^2$/g.

16. A process according to claim 5 wherein the catalyst has a pore volume of at least 2.5 cc/g and a specific surface area of at least 275 m$^2$/g.

17. A process according to claim 6 wherein the catalyst has a pore volume of at least 2.5 cc/g and a specific surface area of at least 275 m$^2$/g.

18. A process according to claim 7 wherein the catalyst has a pore volume of at least 2.5 cc/g and a specific surface area of at least 275 m$^2$/g.

19. A process according to claim 8 wherein the catalyst has a pore volume of at least 2.5 cc/g and a specific surface area of at least 275 m$^2$/g.

20. A process according to claim 9 wherein the catalyst has a pore volume of at least 2.5 cc/g and a specific surface area of at least 275 m$^2$/g.

21. A process according to claim 10 wherein the catalyst has a pore volume of at least 2.5 cc/g and a specific surface area of at least 275 m$^2$/g.

22. A process according to claim 1 wherein the high density polyethylene has a Bell ESCR F50 value of at least 78 hours and a density of from 0.956 to 0.958 g/cc.

23. A process according to claim 1 wherein the shear response of the polyethylene is from 110 to 119.

* * * * *